United States Patent [19]

Kitamura et al.

[11] Patent Number: 5,274,893
[45] Date of Patent: Jan. 4, 1994

[54] BELT FOR FABRICATING A NON-WOVEN FABRIC WITH PROJECTIONS AND METHOD FOR FABRICATING A NON-WOVEN FABRIC WITH PATTERNS

[75] Inventors: Ichihiro Kitamura; Tatsutoshi Nakajima, both of Tokyo, Japan

[73] Assignee: Nippon Filcon Co., Ltd., Tokyo, Japan

[21] Appl. No.: 872,995

[22] Filed: Apr. 24, 1992

[30] Foreign Application Priority Data

Apr. 26, 1991 [JP] Japan .................. 3-188371

[51] Int. Cl.⁵ .................. D04H 5/08; B28B 21/44
[52] U.S. Cl. .................. 28/105; 425/223
[58] Field of Search .......... 28/104, 105, 169; 26/69; 101/28, 30, 31; 249/60, 203; 425/83.1, 223, 224, DIG. 30

[56] References Cited

U.S. PATENT DOCUMENTS

| | | | |
|---|---|---|---|
| 3,034,180 | 5/1962 | Greiner et al. | 28/104 X |
| 3,274,018 | 9/1966 | Russell et al. | 117/11 |
| 3,327,369 | 6/1967 | Catlin | 101/28 X |
| 3,750,236 | 8/1973 | Kalwaites | 28/104 |
| 3,773,452 | 11/1973 | Taga | 425/223 X |
| 4,033,709 | 7/1977 | Kroyer | 425/224 |
| 4,396,448 | 8/1983 | Ohta et al. | 101/28 X |
| 4,718,152 | 1/1988 | Suzuki et al. | 28/104 |
| 4,840,829 | 6/1989 | Suzuki et al. | 428/131 |
| 4,995,151 | 2/1991 | Siegel | 26/69 R |
| 5,115,544 | 5/1992 | Widen | 28/105 |

FOREIGN PATENT DOCUMENTS 0344365 12/1989 European Pat. Off. .
8805838 8/1988 World Int. Prop. O. .

*Primary Examiner*—Clifford D. Crowder
*Assistant Examiner*—John J. Calvert
*Attorney, Agent, or Firm*—Beveridge, DeGrandi, Weilacher & Young

[57] ABSTRACT

Method for manufacturing a non-woven fabric with irregular patterns by using a belt having projections for providing irregular patterns on the non-woven fabric and applying highly pressurized water and hot air onto a fiber assembly placed on and carried by the belt in order to press the fiber assembly to the belt and entangle the fiber of the fiber assembly.

4 Claims, 4 Drawing Sheets

BELT FOR FABRICATING A NON-WOVEN FABRIC WITH PROJECTIONS AND METHOD FOR FABRICATING A NON-WOVEN FABRIC WITH PATTERNS

BACKGROUND OF THE INVENTION

The present invention relates to a belt used for manufacturing a non-woven fabric.

Conventionally, non-woven fabrics have been formed by depositing a fiber assembly onto a mesh carrier belt such as plain woven fabrics and the applying highly pressurized water or hot air to the fiber assembly deposited on the belt to entangle or weld the fibers together to thereby form the non-woven fabric.

It is desirable to form irregular patterns in non-woven fabric in order to provide improved touch and feel properties to the fabric, however, according to the conventional mesh belt, it is impossible to obtain irregular patterns providing a sufficient touch and feel, since the irregularity is provided only by the difference in height between knuckles of weft and warp thereby limiting the irregularity. Therefor, it has been impossible to form a sufficient irregularity only by the fabric of the belt.

Recently, it has been desired to add design patterns such as letters, numbers or characters on a non-woven fabric for the purpose of providing enhanced value to the fabric, but according to the conventional mesh belt, the formation of the patterns was restricted to the textile design of the belt fabric itself so that it was difficult to provide different formations with design patterns and irregular patterns with free formations independent of the configuration of the underlying carrier belt.

SUMMARY OF THE INVENTION

An object of the present invention is to provide a belt for forming a non-woven fabric having freely designed patterns formed therein and possessing comfortable touch and feeling.

The present invention relates to a belt with the following features and a method of fabricating a non-woven fabric as described.

According to the invention there is provided a belt for fabricating a non-woven fabric and used in a machine for forming the non-woven fabric by carrying a fiber assembly, in which belt there are provided a plurality of projections with patterns on the forming-side-surface of the belt body.

In the belt for fabricating the non-woven fabric according to the invention, each of the projections mounted on the forming-side-surface of the belt form, as a whole, the pattern to be given to the non-woven fabric.

In a more detailed aspect, the belt for fabricating the non-woven fabric of the invention has the projections which are mounted on the forming-side-surface of the belt body made of thermoplastic resin and welded onto the forming-side-surface of the belt body. The welding can be accomplished by conventional methods known in the art.

The present invention also provides a method for fabricating a non-woven fabric formed with irregular patterns, wherein a fiber assembly is first deposited onto the carrier belt provided with patterned projections on the forming-side-surface of a belt body, and highly pressurized water or hot air is applied to the fiber assembly in order to press the fiber assembly onto the belt and entangle the fiber thereby forming irregular patterns in the resulting non-woven fabric.

In a more detailed aspect, the method for fabricating a non-woven fabric molded with irregular patterns is carried out wherein a previously made non-woven fabric is mounted on the belt provided with patterned projections on the forming-side-surface of a belt body, and highly pressurized water or hot air is applied onto the non-woven fabric in order to press the non-woven fabric in conformity with the irregular patterns formed by the projections.

Still further, the method for fabricating a non-woven fabric formed with irregular patterns can be carried out according to the invention, wherein the height of the patterned projections provided on the forming-side-surface of a belt body is set to be larger than the thickness of the non-woven fabric to be fabricated, and highly pressurized water or hot air is applied onto a fiber assembly on the belt body to press the fiber assembly onto the belt in order to provide holes in the resulting fabric formed by the projections according to the desired patterns.

The belt body of the present invention is preferably made of weft and warp made of polyethylene terephthalate monofilament, and may be made of monofilament such as polyamide and polypropylene, and metallic wires such as stainless steel and bronze.

Moreover, a single layer fabric, a double layer fabric, a weft double layer fabric, or a warp double layer fabric may be used.

Further, the spiral belt which is made by connecting spiral wires, not fabric, spirally rotated with each other or connecting core wires twisted, may be used, and any other belt for making non-woven fabric on which the projections with patterns can be mounted on the forming-side-surface of the belt body can be used.

Polyurethane and polyvinylchloride resins are suitable as the material to form the projections which establish the desired patterns, and the projections are connected to the belt by using the high frequency welding method or adhesive, furthermore by welding metallic projections to metallic fabric belt.

It is a matter of choice to select and mount projections on the underlying belt with patterns in accordance with any desired patterns, style or design to be imparted to the non-woven fabric produced in the manufacturing process. It is preferable for providing a soft touch as well as design patterns that somewhat smaller projections for providing the soft touch are mounted on the forming-side-surface of the belt body and somewhat larger projections for providing the desired design patterns are mounted thereon with a desirable space to be determined according to each particular product.

The present invention provides a solution for the problem in the prior art that it was impossible to produce a non-woven fabrics having a highly soft touch and additional desirable properties for the reason that the conventional irregular patterns established by the difference in height of knuckle between the weft and the warp of the conventional mesh belt is limited to the small knuckle difference.

According to the present invention, it is possible to provide a belt with desired projections with patterns at the desired positions, and to obtain sufficient height differences and desired patterns, and thereby not be limited by the pattern of the knuckle of weft and warp of the underlying mesh belt.

Thus, the projections with patterns are mounted on the forming-side-surface of the carrying belt body, and therefore the fibers become entangled with each other or oriented by applying highly pressurized water or hot air onto the fiber assembly placed on the belt body and further by moving the fiber assembly due to the movement of the belt. As a result, there is obtained a suitable height difference between the forming-side-surface of the belt body and the projections with patterns, thereby enabling the formation of clear, irregular patterns according to the desired design in the final non-woven fabric product.

According to the present invention, it is also possible to form patterns into previously produced non-woven fabrics, by depositing the non-woven fabric onto the belt of the present invention and then applying highly pressurized water to the fabric to provide the patterns, though the soft feeling is somewhat deteriorated. Furthermore in the same way it is also possible to produce the non-woven fabric with many holes forming patterns by using the belt provided with projections each of which has a height greater than the thickness of the non-woven fabric to be manufactured.

DETAIL DESCRIPTION OF PREFERRED EMBODIMENT OF THE PRESENT INVENTION

The preferred embodiments according to the present invention will be explained in detail with reference to the accompanying drawings hereinafter.

Figure 1:
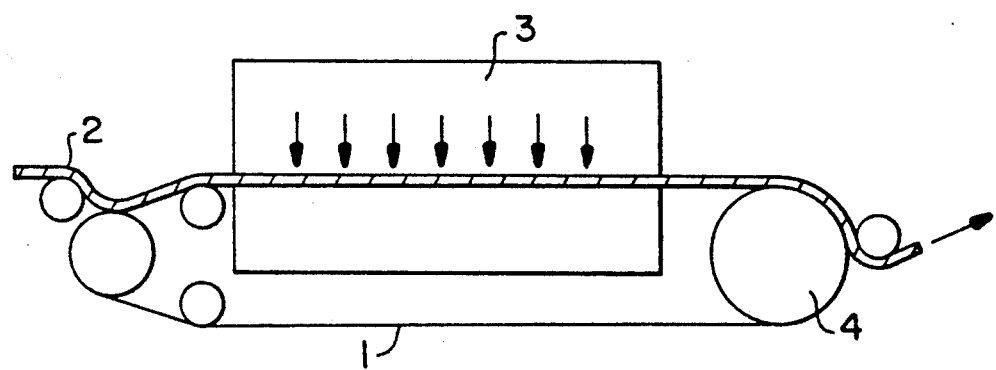
FIG. 1 is a schematic side view for illustrating the manufacturing process of a non-woven fabric.

FIG. 1 is a side view for explaining the method for fabricating a conventional non-woven fabric. Carry belt 1 is mounted on inner rolls 4. Fiber assembly 2, which forms the non-woven fabric, is deposited onto belt 1 and is carried to zone 3 for forming the non-woven fabric on the belt 1. In zone 3, where the non-woven fabric is formed, the arrows show highly pressurized water or hot air pressing down on the fabric assembly 2. As a result of the application of the highly pressurized water or the hot air to the fiber assembly, the fibers of the fiber assembly entangle with each other and weld, together to form the non-woven fabric. Further, the fibers are oriented by the movement of the fluid due to the movement of the belt.

Figure 2:
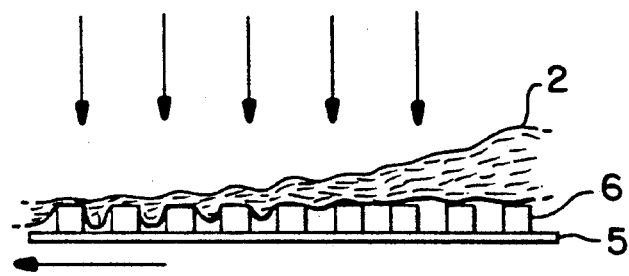
FIG. 2 is a schematic side view of a belt according to the present invention used in the manufacturing process of a non-woven fabric.

FIG. 2 is a enlarged side view for explaining the manufacturing process where the non-woven fabric is fabricated by using the belt of the present invention. Belt body 5 is provided with projections 6 forming any desired pattern mounted on the belt body 5. As the fiber assembly 2 is carried on the belt body 5, irregular patterns are formed in accordance with the design configuration of projections 6.

Figure 3:
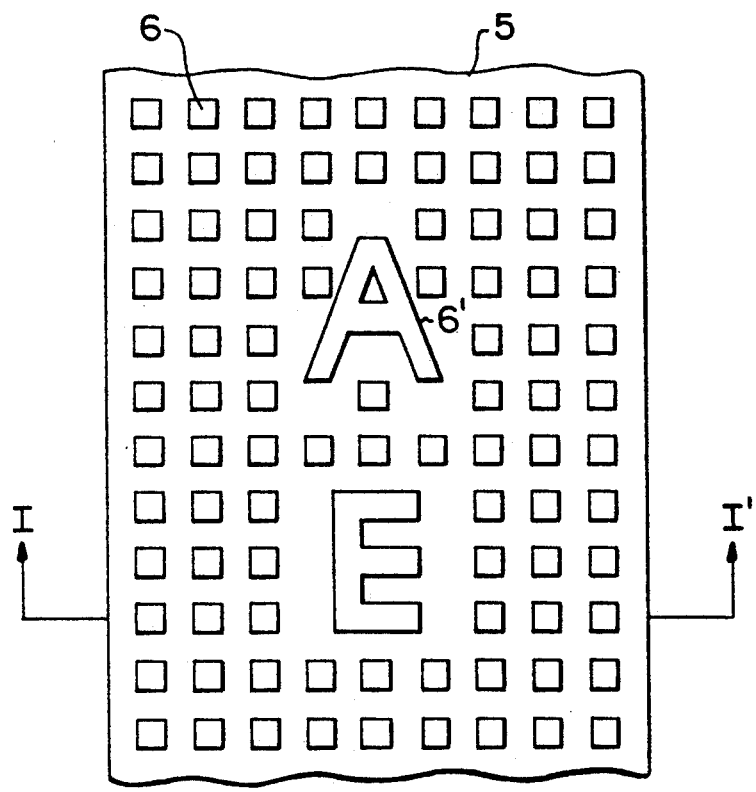
FIG. 3 is a plan view of an embodiment of the belt according to the present invention.

FIG. 3 is a plan view showing a portion of the belt according to the present invention. Belt body 5 is provided with smaller projections 6 which provide for irregular patterns imparting a soft feeling and good touch properties. The belt can also be provided with larger projections 6' with patterns or shapes forming desired patterns and designs in the resulting fabric.

Figure 4:
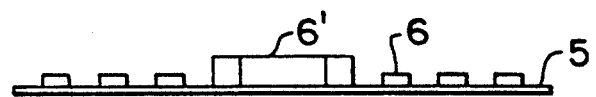
FIG. 4 is sectional view taken along the line I—I' in FIG. 3.

FIG. 4 is sectional view taken along the line I-I' in FIG. 3, in which the difference in height between the surface of the belt body 5 and the projections, 6 and 6', forming patterns is shown. It will be understood that the differences in height may be varied freely in accordance with the formation of the projections.

Figure 5:
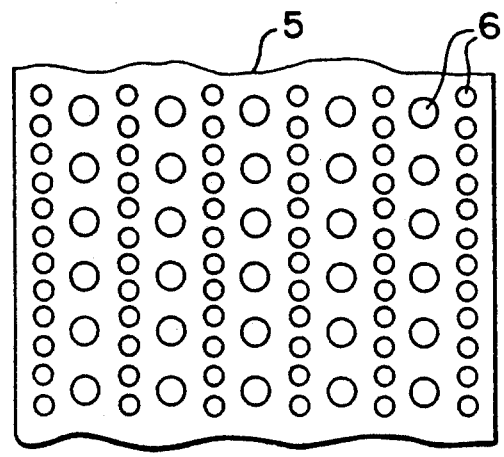
FIG. 5 is a plan view of other embodiment of the belt according to the present invention.
Figure 6:
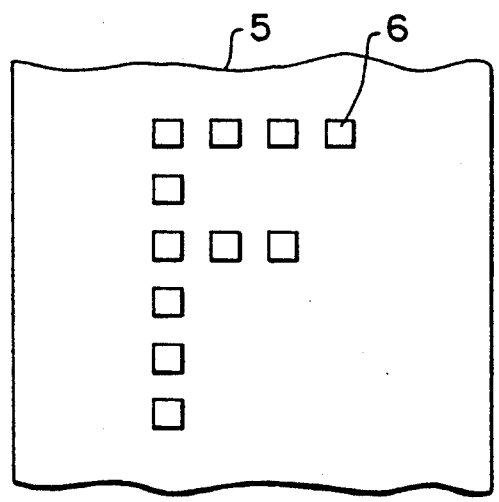
FIG. 6 is a plan view of other embodiment of the belt according to he present invention.
Figure 7:
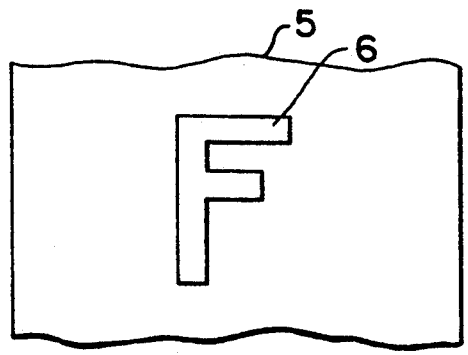
FIG. 7 is a plan view of other embodiment of the belt according to the present invention.

FIGS. 5, 6 and 7 are plan views showing a portion of the belt of the present invention. In FIG. 5 two kinds of circular projections 6, i.e. smaller circles and larger circles forming irregular patterns, are mounted on the forming-side-surface of the belt body 5 for providing highly soft touch and good feel characteristics.

FIG. 6 and FIG. 7 show the belt 5 mounted with projections 6 forming patterns for providing selected designs such as letters, numbers, characters or the like, on the forming-side-surface of the belt body 5. In FIG. 6 there is shown the design patterns composed of a plurality of small projections, and in FIG. 7 the unitary projection per se forms a design pattern.

Figure 8:
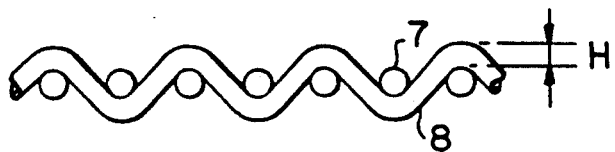
FIG. 8 is a sectional view taken along the weft of the conventional belt.
Figure 9:
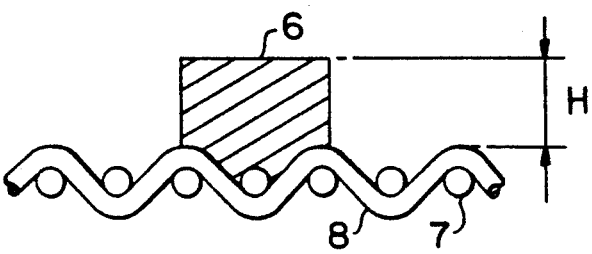
FIG. 9 is a sectional view taken along the weft of the belt according to the present invention.

FIG. 8 and FIG. 9 are each a sectional views showing a portion of the belt cut along the weft. In FIG. 8, there is shown a conventional belt having the irregular surface composed of the difference H in height produced by the weft 8 and the warp 7.

FIG. 9 shows the belt of the present invention, in which there is shown the irregular surface having the difference H in height between the projection 6 with patterns and the forming-side-surface of the belt body.

As is apparent from the comparison between FIGS. 8 and 9, according to the belt of the present invention, it is possible to produce an irregularity with the height larger than that in the conventional belt, and further the height difference, the size and the formation may be varied widely.

By using the belt of the present invention having a large height difference, it is possible to form a sufficiently large irregularity in the fabric produced by the manufacturing process, and therefore obtain non-woven fabrics having soft feel and good touch properties. Furthermore, it is possible to freely select the formation of the projections with any desired patterns and the positions at which the projections are mounted, and therefore to provide all types of design patterns on the non-woven fabric.

Figure 10:
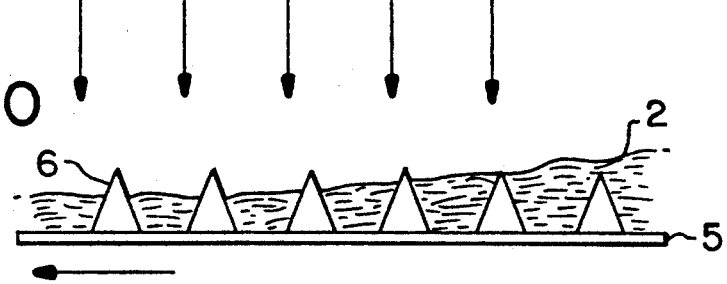
FIG. 10 is a sectional view for explaining the method for applying pattern with holes by using the belt according to the present invention.

In FIG. 10, there is shown a cross section of a belt of the present invention having mounted thereon projections 6 with patterns having the height larger than the thickness of the non-woven fabric to be manufactured. The fiber assembly 2 is compressed in the direction of travel of the belt. By using the belt, there is provided a desired pattern composed of a plurality of holes produced by the projections 6.

Any suitable fiber assembly, such as for example, paper pulp, can be used in practicing the present invention.

What is claimed is:

1. A belt for fabricating a non-woven fabric used in a machine for manufacturing non-woven fabrics from a fiber assembly, said belt being provided with a plurality of projections on the forming-side-surface of said belt body, said projections being greater in height than the thickness of said fabric, some of said projections having larger size and some of said projections having smaller size, the height of projections having larger size is higher than that of the projections having smaller size, to thereby imprint irregular patterns of holes of larger size and holes of smaller size whereby improved touch and feel properties are imparted to said non-woven fabric, and further wherein the projections mounted on said forming-side-surface of said belt body are ones made of a thermoplastic resin and welded on said forming-side-surface of said belt body.

2. The belt for fabricating a non-woven fabric according to claim 1, wherein said projections mounted on said forming-side-surface of said belt body form, as a whole, the pattern to be given to said non-woven fabric.

3. A method for fabricating a non-woven fabric formed with irregular patterns, comprising utilizing a carrier belt having mounted thereon a plurality of projections, said projections being greater in height than the thickness of said fabric and some of said projections having larger size and some of said projections having smaller size, said projections being made of thermoplastic resin and being welded on said forming-side-surfaces of said belt, the height of projections having larger size is higher than that of the projections having smaller size, depositing a fiber assembly onto said belt provided with irregular patterns formed of said projections on the forming-side-surface of said belt, applying highly pressurized water or hot air onto said fiber assembly in order to press said fiber assembly down onto said projections and entangle the fiber to thereby form a non-woven fabric having irregular patterns of holes of larger size and holes of smaller size formed therein and thereby impart improved touch and feel properties to the fabric.

4. A method for fabricating a non-woven fabric formed with irregular patterns, comprising utilizing a carrier belt having mounted thereon a plurality of projections, said projections being greater in height than the thickness of said fabric and some of said projections having larger size and some of said projections having smaller size, said projections being made of thermoplastic resin and being welded on said forming-side-surfaces of said belt body, the height of projections having larger size is higher than that of the projections having smaller size, depositing a previously made non-woven fabric onto said belt provided with patterned projections on the forming-surface of said belt, applying highly pressurized water or hot air onto said non-woven fabric in order to press said non-woven fabric down onto said belt and thereby form irregular patterns of holes of larger size and holes of smaller size in said fabric and thereby impart improved touch and feel properties to the fabric.

* * * * *